US012709840B2

(12) United States Patent
Mudaly et al.

(10) Patent No.: US 12,709,840 B2
(45) Date of Patent: Aug. 18, 2026

(54) PREDICTIVE AND REAL TIME PROCESS INTERVENTION INVOLVING A MULTI-COMPONENT DEFOAMER FEED UNIT

(71) Applicant: Buckman Laboratories International, Inc., Memphis, TN (US)

(72) Inventors: Glenn Mudaly, Mechanicsville, VA (US); Stephen Skirius, Memphis, TN (US); Deborah Marais, Memphis, TN (US); Rohini Kanwar, Memphis, TN (US); Dimitri Kouznetsov, Memphis, TN (US); Daniel Paik, Memphis, TN (US); Yanran Xu, Memphis, TN (US); Shunong Yang, Memphis, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 85 days.

(21) Appl. No.: 18/965,646

(22) Filed: Dec. 2, 2024

(65) Prior Publication Data

US 2025/0179733 A1 Jun. 5, 2025

Related U.S. Application Data

(60) Provisional application No. 63/604,219, filed on Nov. 30, 2023.

(51) Int. Cl.

*D21C 11/00* (2006.01)
*D21G 9/00* (2006.01)
*G05B 13/02* (2006.01)

(52) U.S. Cl.

CPC ....... *D21C 11/0078* (2013.01); *D21G 9/0018* (2013.01); *D21G 9/0054* (2013.01); *G05B 13/0265* (2013.01)

(58) Field of Classification Search

CPC ............. D21C 11/0078; D21G 9/0018; D21G 9/0054; G05B 13/0265

See application file for complete search history.

(56) References Cited

U.S. PATENT DOCUMENTS 1,107,289 A 8/1914 Glauber
4,700,561 A 10/1987 Dougherty
(Continued)

FOREIGN PATENT DOCUMENTS

CN 113089367 A 7/2021
EP 0946818 B1 3/2002
(Continued)

OTHER PUBLICATIONS

Horton et al., Practical Experience with On-Line Entrained Air Testing and Defoamer Control, 2007 TAPPI Papermakers and PIMA International Leadership Conference: Mar. 11-15, 2007, Jacksonville, Florida, USA.

(Continued)

*Primary Examiner* — Christopher W Carter
(74) *Attorney, Agent, or Firm* — Patterson Intellectual Property Law, PC

(57) ABSTRACT

Systems and methods are disclosed herein for proactive intervention in an industrial process involving a defoamer composition. Learning models are iteratively trained using historical input data sets comprising directly measured variables from the industrial process and correlations between combinations of the input data and respective process states. For a current input data set associated with the industrial process, and responsive to detected process attributes, an intervention event is determined with respect to at least a first defoamer component in a current composition. Models are utilized to predict, responsive to the intervention event, changes in target values within a specified range of target values for other components in the current composition (Continued)

and/or for directly measured variables as corresponding with a specified process state. Automatic control is performed for respective actuators to produce a new defoamer composition, and as needed to other actuators for the directly measured variables.

20 Claims, 12 Drawing Sheets

(56) References Cited

U.S. PATENT DOCUMENTS

| | | | |
|---|---|---|---|
| 4,732,651 | A | 3/1988 | Lisnyansky et al. |
| 4,840,704 | A | 6/1989 | Seymour |
| 6,074,522 | A | 6/2000 | Seymour |
| 6,450,006 | B1 | 9/2002 | Dougherty |
| 6,935,164 | B2 | 8/2005 | Liljenberg et al. |
| 7,083,049 | B2 | 8/2006 | Schabel |
| 7,715,929 | B2 | 5/2010 | Skourup et al. |
| 7,817,150 | B2 | 10/2010 | Reichard et al. |
| 8,808,499 | B2 | 8/2014 | Bylander et al. |
| 9,371,613 | B1 | 6/2016 | Lobo et al. |
| 9,477,936 | B2 | 10/2016 | Lawson et al. |
| 9,529,348 | B2 | 12/2016 | Kephart et al. |
| 9,675,905 | B2 | 6/2017 | Mudaly |
| 11,072,890 | B2 | 7/2021 | Mackie et al. |
| 2004/0098148 | A1 | 5/2004 | Retlich et al. |
| 2004/0134630 | A1 | 7/2004 | Lahtinen et al. |
| 2004/0260421 | A1 | 12/2004 | Persson et al. |
| 2009/0319058 | A1 | 12/2009 | Rovaglio et al. |
| 2010/0256795 | A1 | 10/2010 | Mclaughlin et al. |
| 2010/0257227 | A1 | 10/2010 | Mclaughlin et al. |
| 2010/0257228 | A1 | 10/2010 | Staggs et al. |
| 2012/0251996 | A1 | 10/2012 | Jung et al. |
| 2015/0053358 | A1 | 2/2015 | Ban et al. |
| 2017/0068422 | A1 | 3/2017 | Rahul U et al. |
| 2018/0144271 | A1 | 5/2018 | Schlitt et al. |
| 2018/0187376 | A1 | 7/2018 | Mackie et al. |
| 2019/0264387 | A1 | 8/2019 | Orgard et al. |
| 2021/0148047 | A1* | 5/2021 | Schroen ................. D21C 3/228 |
| 2022/0072500 | A1* | 3/2022 | Lusk ....................... C02F 1/686 |
| 2022/0084181 | A1* | 3/2022 | Isken .................... G06T 7/0004 |
| 2024/0192676 | A1* | 6/2024 | Joensuu ................. G06N 5/045 |

FOREIGN PATENT DOCUMENTS

| | | | |
|---|---|---|---|
| EP | 1496154 | B1 | 11/2006 |
| EP | 1318229 | B1 | 4/2007 |
| EP | 2293164 | A1 | 3/2011 |
| EP | 2469466 | A1 | 6/2012 |
| JP | 2004504509 | A | 2/2004 |
| WO | 2018125869 | A1 | 7/2018 |
| WO | 2021097280 | A1 | 5/2021 |

OTHER PUBLICATIONS

Dougherty, "Online entrained-air measurement for brownstock-washer defoamer control", Kraft Pulping Tappi Journal, Jan. 1989, 5 pages.

Mirza et al., "Foam and Entrained Air Management: a Practical Perspective," Chpt. 4 of Applications of Wet-End Paper Chemistry, 2nd ed., Dordrecht, Springer, 2009, pp. 53-72.

International Search Report and Written Opinion for corresponding patent application No. PCT/US2024/058080, dated Mar. 17, 2025, 8 pages.

* cited by examiner

PREDICTIVE AND REAL TIME PROCESS INTERVENTION INVOLVING A MULTI-COMPONENT DEFOAMER FEED UNIT

CROSS-REFERENCES TO RELATED APPLICATIONS

This application claims benefit of U.S. Provisional Patent Application No. 63/604,219, filed Nov. 30, 2023, and which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present invention relates generally to predictive/prescriptive and real time industrial process control. More particularly, systems and methods as disclosed herein in various embodiments may relate to automated control of chemical feed stations to dynamically alter a defoamer composition in an industrial process, and optionally one or more further process components based on predictive models for a desired process state.

BACKGROUND

Precise control of foaming and the parameters which directly, or indirectly, lead to foaming is essential when setting process conditions to optimize performance and cost savings in an industrial process. In addition, high performance component defoamers, which are designed to affect a desired attribute such as knockdown, persistence of foam suppression, deaeration, and the like may be used independently. This type of control prevents the use of excess chemicals since all the components in current defoamers would not be added when only one of the attributes needs adjustment.

The pulp and paper industry may represent one particular and non-limiting example of an industrial process within the scope of the present disclosure. While whitewater systems are illustrated herein as a primary example of processes associated with the pulp and paper industry, such systems are not intended as being limiting, and the scope of the present disclosure may reasonably encompass brown stock washing systems, among others, as may be understood by one of skill in the art. Foam in whitewater systems, in such a process, may be presented as an example of foam limiting manufacturing and production capabilities. Whitewater in a pulp mill is a term used to describe the processed water that contains fibers, chemicals, and other dissolved substances after being used in various stages of paper production.

Whitewater is created primarily during the washing and screening stages of pulp and paper manufacturing. After wood chips are processed into pulp through mechanical or chemical means (such as kraft or sulfite pulping), the pulp is washed to remove chemicals, spent cooking liquor, and other impurities. This washing generates whitewater, which contains fine fibers, fillers, and residual chemicals from the pulping process.

As the pulp is formed into paper on the paper machine, water is used to dilute the pulp slurry, and this water, known as process water, drains through the wire and press sections of the machine. The water that drains away during sheet formation is collected as whitewater.

Whitewater is often reused within the mill to reduce freshwater consumption and further to recover fibers and chemicals. Effective management of whitewater is typically important for water conservation, reducing pollution, and minimizing fiber loss. By treating and recycling whitewater, pulp mills can reduce water consumption, minimize waste, and improve the efficiency of the paper-making process.

Whitewater, as it is pumped and mixed throughout the pulp and paper process, becomes saturated with entrained air and tends to form foam. This entrained air results in slower water drainage through the fibers on the wire and slows production. Also, surface foam can form in the wire pit, where the whitewater is collected, causing other manufacturing related problems. These problems are greatly alleviated with the addition of a defoamer.

Conventional systems and methods may typically add one mixture containing all components to address the three attributes of defoamers-entrained air reduction, surface foam control, and persistence. The application of defoamer can be very specific, wherein for example one defoamer may not work on another line at the same mill. Also, surface foam is not always dependent on entrained air. In order to address a specific issue, such as surface foam, the entire formulation must typically be added, which is not efficient. An effective defoamer is typically suited for the properties of the whitewater. However, the properties of the whitewater can change drastically due to things like upsets, raw material changes or seasonal effects. The resulting change in properties may require a different level of one or all of the defoamer components or a different defoamer all together.

BRIEF SUMMARY

Generally stated, systems and methods as disclosed herein are provided for proactive and automatic process intervention in industrial processes in which foam formation detrimentally affects process operation and productivity. Industries such as pharmaceuticals, chemicals, brewing, paints and coatings, wastewater treatment, oil and gas, food processing, textiles and pulp and paper, etc., can be adversely affected due to foam formation. An exemplary method as disclosed herein for monitoring and automatically adjusting a multi-component defoamer system includes generating signals from a plurality of online sensors, corresponding to directly measured variables for respective process components, predicting a change in target values within a specified range of target values for at least one component in the defoamer composition, and automatically controlling actuators associated with a component of the multi-component defoamer to generate a new defoamer composition.

As further discussed herein, the outputs from online sensors are collected in a module comprising or otherwise utilizing proprietary algorithms, such as for example iteratively trained models in a machine learning environment, to adjust the flow of defoamer component feed pumps and thereby improve the overall performance of an industrial process. These directly measured variables may be used alone or in combination with facility process data such as tons per hour production, temperature, consistency (% solids), and the like. This combination of direct measurement via online sensors with relevant process data may be used to develop low/medium/high ranges for each predictive quality, and/or predict in real time an expected optimization of the industrial process. The system thus allows for manual or automated intervention to bring the process back into control, which ensures better process performance and better final product attributes. Furthermore, the output of the module may be used to control the feed rate of the multi-component defoamer system.

Defoamers usually consist of some combination of hydrophobes, emulsifiers and carriers, which are combined together in one emulsion. This single formulation is preferably stable (i.e., non-separating, consistent viscosity and appropriate particle size distribution) and, when added in small quantities to the process, provides the ability to provide quick knockdown, good de-aeration, and persistence for foam elimination in the process.

Each time the suppression of one or more process attributes is needed, the entire defoamer formulation may be added and all components are dosed at the same time at a set concentration ratio, regardless of whether only one of the attributes needs to be suppressed.

The ability to add less complicated emulsion formulations at the right time, designed to suppress only the attribute that is causing processing inefficiencies, may desirably reduce costs, adding less chemistry to the industrial process and further enable at least partial automation a complicated process for optimal performance.

In a particular embodiment as disclosed herein, a computer-implemented method is provided for proactive intervention in an industrial process involving a defoamer composition, the defoamer composition comprising one or more components and introduced within the industrial process via a defoamer feed unit. The method may include a preliminary stage of iteratively training one or more learning models based on historical input data sets comprising directly measured variables from the industrial process and correlations between combinations of the input data and respective process states. In a current industrial process stage, for a current input data set associated with the industrial process and responsive to at least one detected process attribute, the method may include determining an intervention event with respect to at least a first defoamer component in a current defoamer composition, and predicting, via at least one retrieved model of the one or more machine learning models responsive to the determined intervention event, a change in target values within a specified range of target values for at least one other component in the current defoamer composition and/or for at least one of the directly measured variables as corresponding with a specified process state. Respective actuators associated with the at least first component are automatically controlled to generate a new defoamer composition, and further in view of the change in target values for the at least one other component and/or for the at least one of the directly measured variables.

As used herein, a "learning model" may include or otherwise reference, without limitation, artificial intelligence (AI), machine learning (ML), deep learning (DL), or the like, as may be appreciated or otherwise implemented in context by one of skill in the art, unless otherwise explicitly noted herein for a given application. The term 'machine learning models' may encompass all types of models that utilize machine learning techniques, including but not limited to simple models (e.g., linear regression, decision trees) and complex models (e.g., deep learning models with multiple neural network layers). In various embodiments, for one or more such AI/ML/DL models, the prediction performance may be continuously benchmarked, and a model demonstrating the highest performance may be selected for predictive or prescriptive operations. The performance scores may be recorded to establish a long-term performance pattern, which is utilized to inform model selection in response to seasonal and environmental variations. The model framework can be designed for all-purpose applications, but each specific model may be customized for example in its algorithm types, structure, and parameter settings for a single purpose. The specifics of each model may vary based, for example, on the industrial process, process conditions, historical input data, and other relevant factors as may be appreciated by one of skill in the art.

In one optional aspect according to the above-referenced embodiment, the respective actuators may be automatically controlled to control a concentration ratio of a plurality of components in the new defoamer composition.

In another optional aspect according to the above-referenced embodiment, the respective actuators may be automatically controlled to further dynamically and independently control a relative timing of addition for each defoamer component of the plurality of defoamer components. The relative injection timing is a unique control parameter as compared with conventional techniques which include injecting premixed defoamer, and such dynamic control may preferably optimize the effectiveness of the defoaming process.

In another optional aspect according to the above-referenced embodiment, the change in target values may be predicted based on a modeled correlation between the current input data and the specified process state.

In another optional aspect according to the above-referenced embodiment, the new defoamer composition may be automatically optimized based on the current input data set and one or more user specified parameters, optionally further in view of the predicted change in target value, wherein the respective actuators associated with the at least first component may be automatically controlled to generate the optimized defoamer composition.

The one or more user specified parameters may for example comprise but are not limited to cost, amount of chemicals, hazards (e.g., toxicity), environmental sustainability, and/or various operating parameters such as, but not exclusively, location of addition, desired defoaming rate, defoamer dosing sequence, and/or pump duty cycles.

In another optional aspect according to the above-referenced embodiment, the directly measured variables from the industrial process may comprise two or more of: entrained air; foam height; foam bubble size and bubble size distribution, conductivity; turbidity; temperature; oxidation-reduction potential; pH; and the like. These directly measured variables may be used alone or optionally in combination with other industrial process data including for example tons per hour production, temperature, consistency (% solids), and other commonly measured parameters. Various combinations of direct measurements via online sensors, optionally combined with the other industrial process data, may be used to develop low/medium/high ranges for each predictive quality. A certain level of a combination of measured variables may accordingly predict in real time the expected optimization of the process.

In another optional aspect according to the above-referenced embodiment, foam height as one of the variables may be directly measured from input signals received from various devices such as but not limited to a digital camera, optical device, acoustic device, capacitive device, radio wave device, electrical contact device, and/or combinations thereof. A digital camera may for example be arranged online for close up images of foam/bubbles for morphology and film thickness, bubble size, etc., and having high enough resolution to use for image analysis and calculations.

In another optional aspect according to the above-referenced embodiment and optional aspects, the at least one detected process attribute may relate to foaming conditions. The foaming conditions may for example comprise a threshold foaming condition, and/or an observed foaming condition having a predictive quality according to a selected machine learning model.

In another optional aspect according to the above-referenced embodiment and optional aspects, for the current input data set associated with the industrial process, and responsive to the at least one detected process attribute, an event requiring intervention with respect to the at least first defoamer component in the current defoamer composition may be predicted based on patterns derived from a selected learning model.

In another optional aspect according to the above-referenced embodiment and optional aspects, the method may include, responsive to the determined intervention event, generating an output signal to produce an audio and/or visual alert to an operator control panel, and/or a remote user interface such as for example may be rendered on a mobile user computing device, in association with generation of the new defoamer composition.

The output signal may for example produce a visual representation of the change in target values for the components of the new defoamer composition.

In another embodiment, a system as disclosed herein for proactive intervention in an industrial process may include one or more online sensors configured to generate output signals representative of directly measured variables from the industrial process, and a defoamer feed unit configured to controllably introduce a defoamer composition comprising specified amounts at specified dosing rates for each of a plurality of components within the industrial process. One or more processors are functionally linked to the one or more online sensors and the defoamer feed unit, and configured to direct the performance of steps in a method according to the above-referenced embodiment and optionally one or more of the above-referenced aspects thereof.

Numerous objects, features and advantages of the embodiments set forth herein will be readily apparent to those skilled in the art upon reading of the following disclosure when taken in conjunction with the accompanying drawings.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The following detailed description of embodiments of the present disclosure refers to FIGS. 1-9. Each drawing is provided by way of explanation of the present disclosure and is not a limitation. Those skilled in the art will understand that various modifications and variations can be made to the teachings of the present disclosure without departing from the scope of the disclosure. For instance, features illustrated or described as part of one embodiment can be used with another embodiment to yield a still further embodiment.

The present disclosure is intended to cover such modifications and variations as come within the scope of the appended claims and their equivalents. Other objects, features, and aspects of the present disclosure are disclosed in the following detailed description. One of skill in the art will understand that the present discussion is a description of exemplary embodiments only and is not intended as limiting the broader aspects of the present disclosure.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. As used herein, the phrase "one or more of," when used with a list of items, means that different combinations of one or more of the items may be used and only one of each item in the list may be needed. For example, "one or more of" item A, item B, and item C may include, without limitation, item A or item A and item B. This example also may include item A, item B, and item C, or item B and item C.

Figure 1:
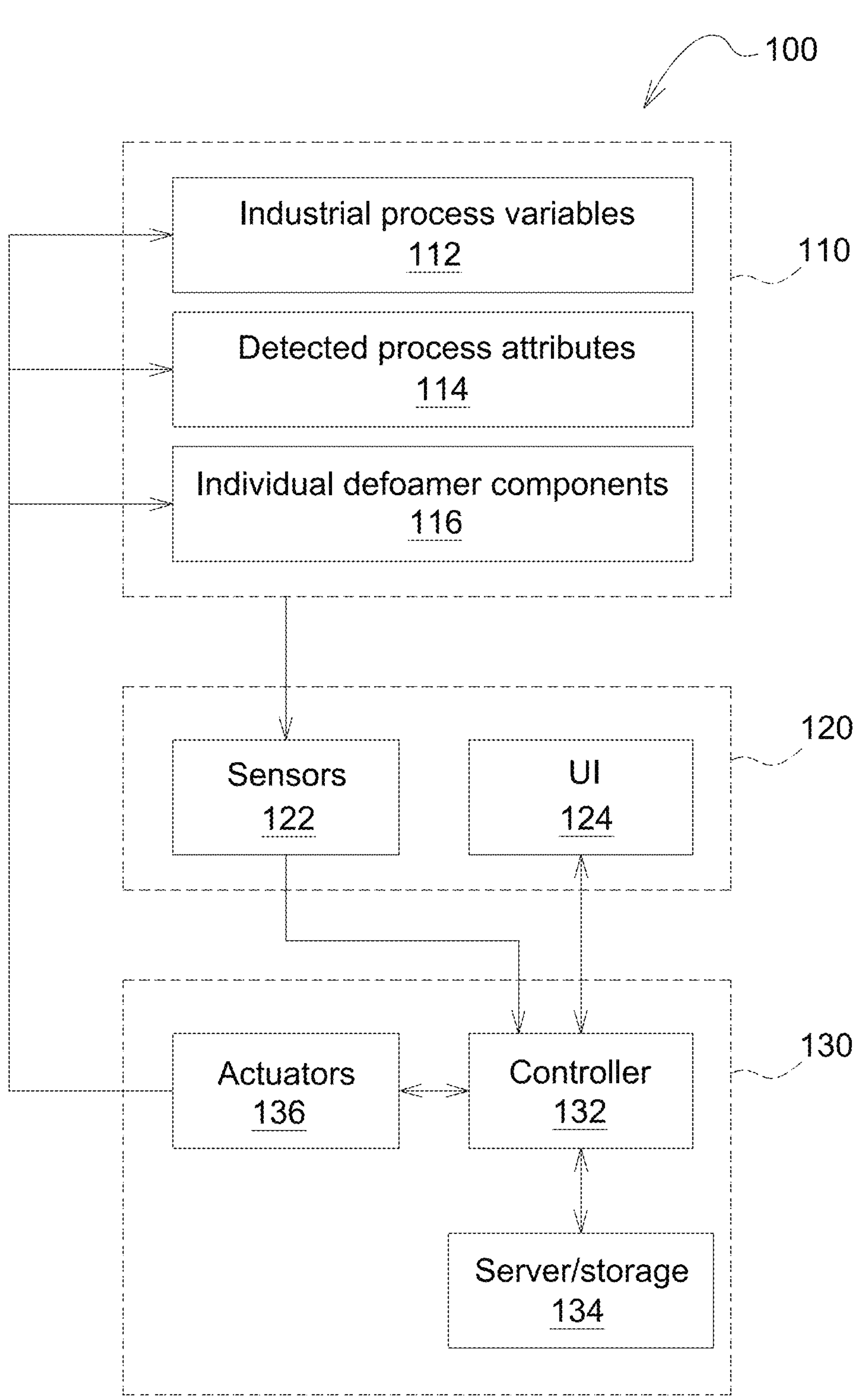
FIG. 1 is a block diagram representing an embodiment of an industrial process system as disclosed herein.

Referring first to FIG. 1, an embodiment of an industrial process system 100 as disclosed herein may be provided with respect to a multi-component defoamer system and process in a pulp mill. The term "industrial process system" as used herein may generally connote a system utilized by varying industries, including but not limited to industries such as pharmaceuticals, chemicals, brewing, paints and coatings, wastewater treatment, oil and gas, food processing, textiles, pulp and paper, and the like. As used herein, a "defoamer composition" may include one or more "defoamer components," with each defoamer component including one or more chemical compounds. Accordingly, a defoamer composition within the scope of the present disclosure may include a single chemical compound, or a formulation including multiple defoamer components each of which include one or more chemical compounds, etc.

As disclosed herein, the industrial process system 100 includes a controller that receives process information from various sensing devices and relays (e.g., entrained air meters, refractometers, Coriolis mass meters, flowmeters, thermocouples, consistency transmitters, etc.). This data may be used as inputs for dynamic process control algorithms which may monitor and directly control outputs for adjusting at least a multi-component defoamer composition. The data collected may integrate with a machine learning environment for prediction and customization of needed individual defoamer components and continual augmentation of those components.

An embodiment of a process stage 110 may include various system components associated with industrial process variables 112, detected process attributes 114 and individual defoamer components 116. As used herein, each of the individual defoamer components 116 may consist of emulsifiers and surfactants, which may be independent of one another or combined into different formulations. Individual defoamer components 116 may include emulsifiers and/or surfactants which are stored individually or in varying combinations. The industrial process variables 112 may be identified alone or in combination with facility process data, and may for example include tons per hour of production, temperature, consistency (e.g., percent solid), entrained air, foam height, conductivity, turbidity, pH, and/or other commonly measured parameters. These industrial process variables 112 may be measured to produce detected process attributes 114. Once measured, these detected process attributes 114 may relate to a threshold foaming condition or to an observed foaming condition having a predictive quality according to a selected machine learning model.

An embodiment of a data collection stage 120 is accordingly added into the system 100 to provide real-time measurements for at least the industrial process variables 112 above. One or more online sensors 122 are configured to provide substantially continuous control signals representative of the industrial process characteristics 112. The term "sensors" may include sensors, relays, and equivalent monitoring devices as may be provided to directly measure values for the process characteristics, or to measure appropriate derivative values from which the industrial process variables 112 may be measured or calculated. Various conventional devices are well known in the art for the purpose of continuously sensing or calculating characteristics such as entrained air, washer speed, liquor solids, conductivity, and the like, and exemplary such sensors are considered as being fully compatible with the scope of the system and method as disclosed herein.

The term "online" as used herein may generally refer to the use of a device, sensor, or corresponding elements proximally located to the machine or associated process elements and generating output signals in real time corresponding to the industrial process variable 112, as distinguished from manual or automated sample collection and "offline" analysis in a laboratory or through visual observation by one or more operators.

Individual sensors may be separately implemented for the respective output signals to be collected, or in some embodiments one or more individual sensors may provide respective output signals that are implemented for the calculation of multiple variables. Individual sensors may be separately mounted and configured, or the system may provide a modular housing which includes a plurality of sensors or sensing elements. Sensors or sensor elements may be mounted permanently or portably in a particular location respective to a production stage or may be dynamically adjustable in position so as to collect data from a plurality of locations during operation.

One or more additional online sensors may provide substantially continuous measurements with respect to various controlled industrial process variables 112.

A user interface 124 is further provided and configured to display process information and/or to enable operator input regarding additional parameters and/or coefficients. For example, an operator may be able to selectively monitor industrial process variables 112 in real-time, and also select control parameters such as threshold levels and/or optimal ranges for one or more of the industrial process variables 112. The term "user interface" as used herein may unless otherwise stated include any input-output module with respect to the controller including but not limited to: a stationary operator panel with keyed data entry, touch screen, buttons, dials or the like; web portals, such as individual web pages or those collectively defining a hosted website; mobile device applications, and the like. Accordingly, one example of the user interface may be generated remotely on a user computing device and communicatively linked to the remote server 134 and/or the local controller 132.

The term "continuous" as used herein, at least with respect to the disclosed measurements, does not require an explicit degree of continuity, but rather may generally describe a series of online measurements corresponding to physical and technological capabilities of the sensors, the physical and technological capabilities of the transmission media, the physical and technological capabilities of the controller and/or interface configured to receive the sensor output signals, and/or the requirements of the associated control loop(s). For example, measurements may be taken and provided periodically and at a rate slower than the maximum possible rate based on the relevant hardware components, based on a control configuration which smooths out input values over time or otherwise does not benefit from an increased frequency of input data, and still be considered "continuous."

The measurement data from the various sensors 122, and the input data from one or more users via the user interface 124, are provided to a control stage 130, an embodiment of which is represented in FIG. 1 as including a controller 132. The controller 132 may be a "local" controller configured to directly receive the aforementioned signals and perform specified data processing and control functions, while separately corresponding with a remote server 134 (or cloud-based computing network) via a communications network (not shown). Generally speaking, the output signals may be provided from individual sensors 122 to actuators 136. The controller 132 may be integrated within or otherwise operate cooperatively alongside an existing industrial control system of industrial components. For example, the controller 132 may generate control signals to the various actuators via the industrial control system, or in some embodiments the controller 132 may generate control signals directly to some or all of the various actuators 136 associated with industrial process variables 112.

The term "communications network" as used herein with respect to data communications between two or more system components or otherwise between communications network interfaces associated with two or more system components may refer to any one of, or a combination of any two or more of, telecommunications networks (whether wired, wireless, cellular or the like), a global network such as the Internet, local networks, network links, Internet Service Providers (ISP's), and intermediate communication interfaces. Any one or more recognized interface standards may be implemented therewith, including but not limited to Bluetooth, FR, Ethernet, and the like.

In an embodiment, a conversion stage may be added for the purpose of converting raw signals from one or more of the online sensors 122 to a signal compatible with the input requirements of the controller 132. A conversion stage may relate not only to input requirements but also may further be provided for data security between one or more sensors and the controller 132 as described above, and/or between the controller 132 and a user computing device, for example to encrypt, decrypt, or otherwise selectively enable access to signals between respective devices.

Terms such as "controller" or "computer" as used herein may refer to, be embodied by or otherwise included within a machines, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of certain acts, functions and algorithms described herein. A general-purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

In an embodiment, the controller 132 and/or the remote server 134 from the control stage 130 may be communicatively linked to a proprietary cloud-based data storage, for example a plurality of databases or equivalent storage media for retrievably storing models and input data for development thereof. The controller in functional communication with the data storage may for example be configured to obtain, process, and aggregate/store data for the purpose of developing correlations over time, improving upon existing linear regressions or other relevant iterative algorithms, etc. The controller 132 may be configured to include certain correlations, equations and/or algorithms in a local data storage, while continuously or periodically transmitting relevant data to the remote server 134, and for example periodically retrieving any changes to the correlations, equations and/or algorithms as may be determined with the additional input data over time via, e.g., machine learning.

In certain embodiments, the remote data capability of the system may enable the application of machine learning concepts to a multi-component defoamer system to enhance the controls over time. One of skill in the art of defoamer systems may appreciate or otherwise be able to determine the value of many other variables in the control algorithms. The following is a non-exhaustive list of inputs that may be included in modeling of the systems; mat thickness measurement (using a tool to measure the thickness as opposed to assuming the thickness from input calculations); mat consistency measurement (using, e.g., a near-infrared light or equivalent device to measure the consistency of the mat in real time); stock temperature; filtrate temperature; shower temperature; pH of stock and filtrate; residual alkali in stock exiting the digester, conductivity in the washer vats and/or filtrate; filtrate tank levels; dropleg vacuum; Kappa measurement of the stock; fiber species; refiner loading; stock consistency; vacuum box levels on horizontal belt washers; vacuum on horizontal belt washers; headbox pressure on direct displacement and compaction baffle washers; washer drum motor loads; repulper motor loads; and/or stock pump motor loads.

Figure 2:
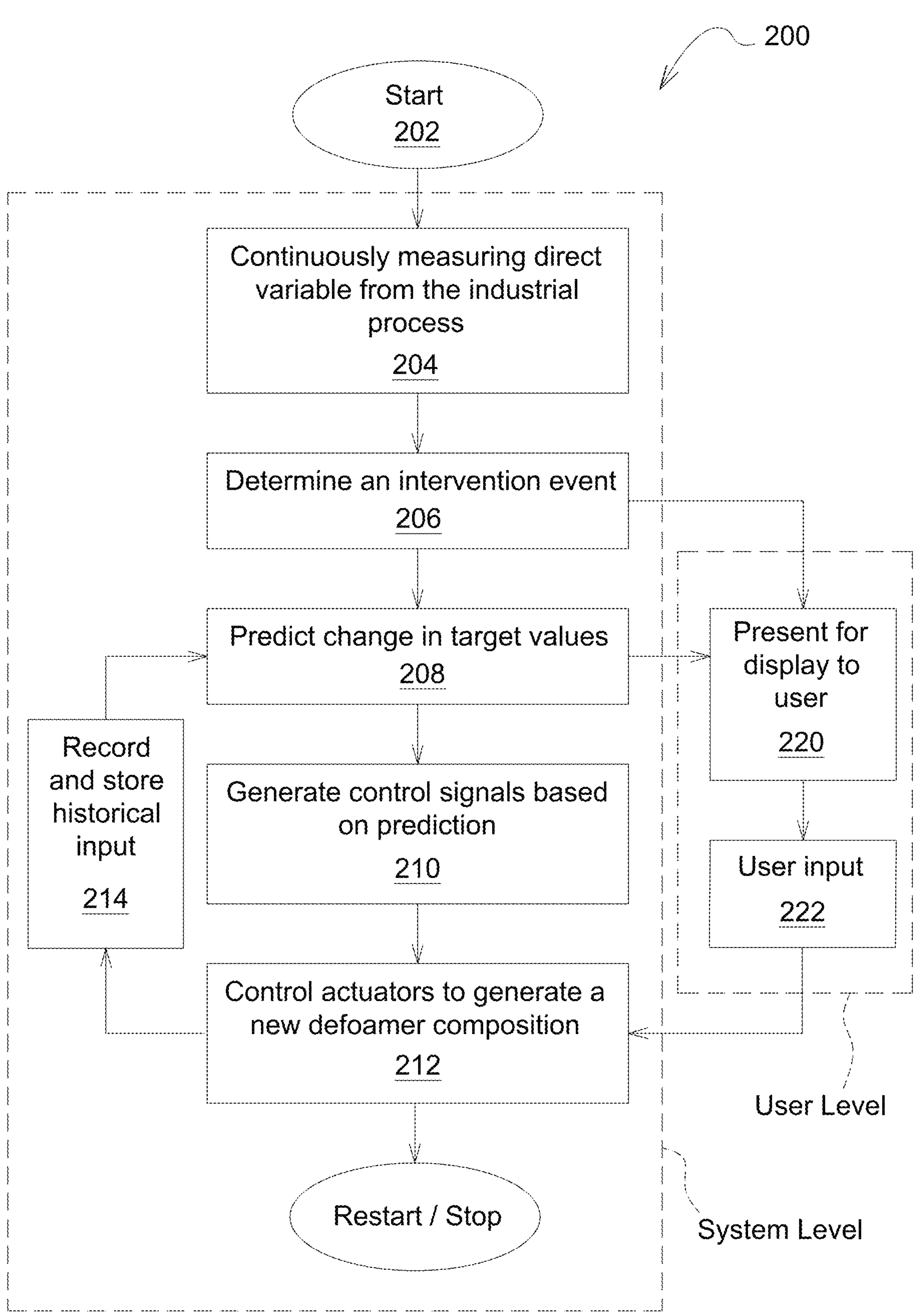
FIG. 2 is a flowchart representing an embodiment of a computer-implemented method for proactive intervention as disclosed herein.

Referring now to FIG. 2, an embodiment may now be described for an exemplary method 200 for monitoring and adjusting a multi-component defoamer system, substantially in accordance with an embodiment of the system 100 as disclosed above.

In the particular embodiment, upon starting the process (step 202) the online sensors 122 generate, e.g., substantially continuously, output signals corresponding to actual values respective of the industrial process variables 112 (step 204). The output signals may be provided in raw form for conversion, calibration, and otherwise for measurement of the actual values of the process characteristics, or the measurements may be directly output from the sensor to the local controller 132.

The following steps may be performed by either the of the local controller 132 or the remote server 134. In an exemplary embodiment, the local controller performs all of the data processing and control operations as required for ordinary functioning of the process but may pass information along to a remote server for cloud-based analytics and data processing. In an embodiment, the controller 132 may be configured to access the remote server 134, or provide access to the remote server, for system updates such as for example to update the software or algorithm programming, configurations, and the like. However, the scope of a process as disclosed herein is not structurally limited to this configuration unless otherwise specifically noted.

In step 206 of the present embodiment, the controller 132 ascertains whether an issue requiring intervention is required based on the actual values measured from the industrial process variables 112 and detected process attributes 114. For example, the controller 132 may determine an intervention event with respect to at least a first defoamer component in a current defoamer composition. Upon determining that intervention is required, or at least desirable, for an ascertained issue in the process, the method 200 may continue by generating an output signal therefor. In one example, an output signal may be generated to an operator control panel, user interface, or other alternative audio/visual indicators for the purpose of providing an alert, alarm, message, or the like (step 220). In one example, a user may be given the opportunity to manually implement the prompted intervention, implement a different intervention relating to the issue, or disregard the intervention (step 222).

In step 206 of the present embodiment, the controller 132 presents the measured actual values (or alternatively said values as provided directly from the corresponding online sensors 122) and determined intervention event to a user interface 124 for display and monitoring purposes (step 220). Various exemplary screens of the user interface may be designed to identify functions such as operation, configuration, analytics and system alarms. In one example, an output signal may be generated to an operator control panel, user interface, or other alternative audio/visual indicators for the purpose of providing an alert, alarm, message, or the like (step 220). The controller 132 may also provide a layer of security by password protecting these functions or providing limited accessibility to users based on user classification. In step 222, the user interface 124 may enable user input regarding optimal ranges or threshold levels for one or more controllable industrial process variables 112.

In step 208 of the present embodiment, the controller 132 may predict a change in target values within a specified range of target values for at least one component of the multi-component defoamer and/or for at least one of the directly measured industrial process variables 112. This prediction may be determined via a retrieved model of the machine learning models responsive to, individually or in combination, the determined intervention event (step 206), the continuously generated output signals corresponding to actual values respective of the industrial process variables 112 (step 204), and the historical input data sets comprised of directly measured variables from the industrial process variables 112 and correlations between combinations of the input data and respective process states (step 214). In one embodiment, the predictions generated in step 208 may be used to develop low, medium, and high ranges for each predictive quality.

In one example, a sensor may be installed on a brown stock washing system for monitoring at least one of the industrial process variables (e.g., entrained air). The system would continually measure the amount of entrained air and as the entrained air starts to increase and other industrial process variables are changing, at least a first component of the multi-component defoamer needs to be added to reduce the entrained air and regulate the other industrial process variables back to the optimal target ranges.

Based on the predicted change in target values, the controller 132 may predict an impact of subsequent control responses to industrial process variables 112. In other words, the controller considers not only how an industrial process characteristic itself may be optimized through control response, but also how these control responses would impact certain industrial process variables 112. Controller-based algorithms effectively model these interactions and correlations to optimize performance for each of the industrial process variables 112 and the impacted process characteristics, thereby minimizing the potential for variability and negative feedback loops.

In an embodiment, a system as disclosed herein may be configured to iteratively train one or more machine learning models over time based on historical input data sets, for example comprising any one or more directly measured variables from the industrial process as previously discussed herein, and correlations between combinations of the input data and respective process states. Such process states may for example include one or more of a first grouping of process states wherein each of relevant process attributes are within acceptable ranges or otherwise do not presently require intervention, one or more of a second grouping of process states wherein at least one process attribute is out of range and some form of intervention is required, one or more of a third grouping of states wherein a user may be prompted to confirm whether intervention is to be initiated, etc.

Such machine learning models may for example include supervised learning techniques, wherein user input associated with a specified grouping of directly measured inputs may be utilized for correlation of the grouping with a user-selected process state, and wherein over time a similar group of directly measured inputs may be automatically correlated with the user-selected process state with a reasonably high probability of success. Further user input may of course in various embodiments be solicited or otherwise provided as feedback for continued improvement of the models over time.

With one or more models having been developed, and in various embodiments sufficiently validated, a model may be identified with respect to a current input data set associated with the industrial process. Further responsive to at least one detected process attribute, an intervention event may further be determined with respect to at least a first defoamer component in a current defoamer composition, and a change in target values predicted within a specified range of target values for at least one other component in the current defoamer composition and/or for at least one of the directly measured variables as corresponding with a specified process state.

In a particular embodiment, a selected model may determine that at least one component in a multi-component defoamer composition should be adjusted, for example to affect at least one attribute in an industrial process, such as knockdown, persistence, deaeration, etc. The controller 210 may first determine whether further adjustments to one or more other components of the defoamer composition are required in view of the initial adjustment, for example to maintain requisite characteristics of the defoamer composition such as stability, effectiveness, etc. The controller 210 may further determine whether further adjustments to one or more other process variables (aside from the defoamer composition) are further required to account for the changes in the defoamer composition, and preferably to optimize the industrial process.

It may be appreciated that such calculations may be quite complex, as a substantial number of process variables and their interrelation thereof will be considered, further in view of the reality that various process variables are relevant to the calculations but are not practically capable of being directly measured, at least on a consistent or reliable basis. Accordingly, predictive models within the scope of the present disclosure may reasonably be expected to improve in performance over time and with the introduction of feedback data for continuing to correlate an (essentially) infinite number of input combinations with relevant industrial processes, process states associated with the respective industrial processes, target values and/or ranges for process variables, and the like.

To the extent that one or more selectively retrievable models as disclosed herein may be at least partially probabilistic in nature, allowing for potential time-series or similar progression curves over time and trying to blend or otherwise account for all such possibilities and related uncertainties in identifying process states, predicting optimal target values and associated intervention events, feedback loops including actual directly measured online values and/or corresponding user inputs may accordingly allow the system to effectively rule out or minimize in relevance certain such model components with respect to a given combination of defoamer components, or combination of a specified defoamer composition with other particular process variables or ranges thereof, based for example on a projected aggregation of such variables, attributes, and the like. For example, a specified combination of defoamer composition and other process variables may initially appear to be acceptable (i.e., associated with a first process state) but result in one or more undesirable attributes over time which may be correlated with the initial combination in a manner heretofore unappreciated (i.e., associated with a second process state), wherein either the specified combination may be identified as unacceptable in future analogous contexts or, in some embodiments, the combination is internally labeled or otherwise weighted for future probabilistic consideration as being potentially negatively impactful in future analogous contexts, depending for example on further inputs over time.

At least in view of the aforementioned aspects of learning models and/or algorithms (i.e., "models") within the scope of the present disclosure, one of skill in the art may appreciate that the models may be self-learning in nature, improving over time based on feedback loops for comparing actual and directly measured values, or manual inputs corresponding to such values, for observed outcomes with respect to expected values therefor. The "self-learning" aspect of models in this context may for example encompass or otherwise imply the incorporation of an automated program to periodically re-train the model with updated data sets, such as those from feedback loops and transient conditions influenced by seasonal changes, and the provision of which may be contemplated within the scope of the present disclosure. The present disclosure may further contemplate models which are self-adjusting in nature to account for transient conditions, such as for example seasonal changes and corresponding impacts on one or more of the system components. The present disclosure may further contemplate models which are self-supplying in nature with respect to one or more elements of an input data set. For example, in an embodiment it may be understood that input signals from one or more sensors or other data sources in an operational environment may become unavailable, in which case it may be possible for the models to selectively incorporate values as substitute inputs based on historical information and further update the model by training the new model with substitute inputs. One of skill in the art may appreciate at least in view of the disclosure herein that a current (i.e., preexisting) model will become a 'new' model if the inputs are changed, and the model structure may also change accordingly with the new inputs, but this training process can be implemented as an automated program.

In step 210, the controller 132 may generate control signals based on the predictions generated in step 208. These control signals may be output directly or otherwise to actuators 136 for local implementation. For example, the controller 132 may generate control signals to any one or more system actuators for regulating respective industrial process variables 112 based on detected variations between the measured actual values and the dynamically set target values.

In step 212, the actuators 136, responsive to the generated control signals of step 210, generate a new defoamer composition. In an embodiment, at least one of the plurality of actuators 122, may be configured to control at least one component of the multi-component defoamer. For example, in response to the generated control signals, an actuator may control the at least first component to generate a new defoamer composition, in view of the change in target values for the at least one other component and/or for the at least one of the directly measured industrial process variables 112.

In step 214 of the present embodiment, the controller may continuously or periodically deliver and store data (in raw form or for example as aggregated over time) to the remote server 134 for analytics. This stored data may be comprised of the directly measured variables from the industrial process and correlations between combinations of the input data and respective process states. In an embodiment, the stored data may be periodically or continuously retrieved and integrated into step 208, thereby refining the machine learning models.

In one example, the system would recognize corresponding patterns in the directly measured data obtained from at least one of the sensors 122. Upon recognition, the system would determine that at least one component of the multi-component defoamer is needed to maintain target levels and may add the at least one component of the multi-component defoamer preemptively before a change in the data obtained by the at least one sensor is detected.

For illustrative purposes, and without limiting the scope of the present disclosure unless otherwise expressly stated, an exemplary application pertaining to the pulp and paper industry may include sensors which are for example installed on a brown stock washing system for monitoring vat level, vat dilution rate, drum speed, entrained air, temperature, pH, etc., and configured to collect data at an adequate frequency. The system learns that as the entrained air starts to increase and the vat dilution rate, vat level and drum speed are changing, component "A" needs to be added to reduce the entrained air and bring the other sensors back to optimal performance. Also, the exemplary system learns over time that this pattern in sensor response occurs, as an example, at regular intervals every fifteen minutes. Accordingly, the addition of component "A" may be implemented preemptively and before a change in entrained air is even directly/physically detectable. The sensors may for example constantly monitor the continually changing conditions and adjust the amounts of any further required defoamer component formulations which need to be added.

Another exemplary application pertaining to the pulp and paper industry, and relating for example to an automated system 300 for developing predictive/learning algorithms according to a method of the present disclosure, may now be discussed with reference to FIGS. 3-9.

Figure 3:
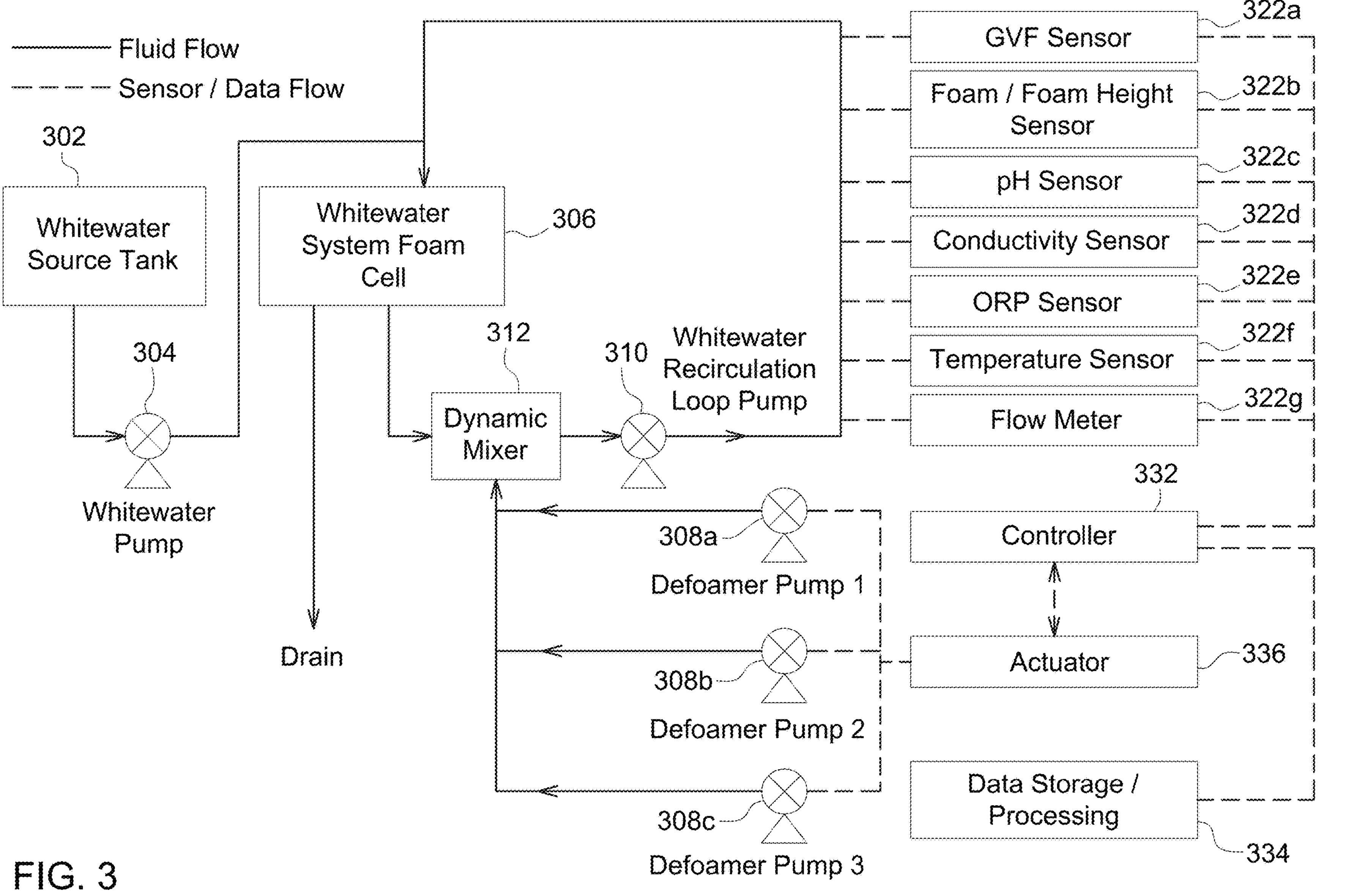
FIG. 3 is a block diagram representing an embodiment of a system as disclosed herein and in the context of a pulp and paper process application.

As represented in FIG. 3, the system 300 may be configured to collect data for various simple defoamer formulations (in the illustrated example, three), and configured to primarily address each of three main defoaming characteristics individually. To understand the effect of each defoamer component for different whitewater conditions, the concentration of defoamer components may be varied/controlled along with the properties of the whitewater. Data sets may be acquired and stored in data storage 334, and further analyzed by using learning algorithms, for example different artificial intelligence/machine learning/deep learning algorithms, with an objective of dynamically optimizing the defoamer components in real time as whitewater conditions change. It may be appreciated that FIG. 3 includes a flow diagram which represents an example of a system 300 according to the present disclosure, and more particularly an experimental system which is not necessarily what may be implemented in any of various field applications which may vary from site to site and with respect to white water stream components, seasonal variations, how the samples are collected, etc.

At least in an experimental context, the source whitewater to be tested may be made/modified and stored in an intermediate bulk container (IBC) 302 in a laboratory every day to ensure the consistency throughout the experiment as well as between sample to sample. The whitewater system foam cell 306 may receive a continuous flow from a primary whitewater pump 304, and the contents therein may be dynamically modified through recirculation via pump 310 and by mixing in defoaming components using pumps *308a*, *308a*, *308c*. Certain characteristics or other parameters associated with the system 300, for example with respect to recirculated whitewater having been dosed with one or more defoamer components and mixed together with the source water, may be measured using sensors 322, for example relating to a gas volume fraction percentage (% GVF) 322*a*, foam characteristics such as foam height 322*b*, pH 322*c*, electrical conductivity (EC) 322*d*, oxidation-reduction potential (ORP) 322*e*, temperature 322*f*, flow 322*g*, and the like. Such measurements may for example be taken continuously from the beginning to the end of experiments, or before and after rounds of dosing, etc. In some embodiments, a dynamic mixer rotation speed may be variable in nature and controlled proactively in view of the selected dosing blend, and/or reactively in view of feedback provided with respect to sensed characteristics or other parameters associated with the blend.

A dynamic mixing device 312 having a rotating shaft and impellers may for example be provided to more efficiently disperse the defoamer components into the process, if necessary. In other embodiments, a dynamic mixing device 312 may alternatively be implemented using ultrasonic, atomization, high pressure injection/spray nozzle, etc.

The dosing of the multiple (e.g., three) defoamers may be controlled by different pumps 308*a*, 308*b*, 308*c*, which may for example be automatically turned on and off via actuator (s) 336, further responsive to signals from controller 332 and following a scripted timer schedule. When a pump is on, the concentration of defoamer increases at the rate of the pumping speed. The pumping speed of each pump may be set manually and maintained constant for the entire experiment. After the defoamer components are injected, they quickly reach a maximum concentration, then continually decrease in concentration, the rate of which depends on the rate of the whitewater pump 304 and the fluid dynamics of the system.

Figure 4:
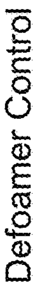
FIG. 4 is a graphical diagram representing an example of defoamer dosing control as disclosed herein with respect to the pulp and paper process application.
Figure 4:
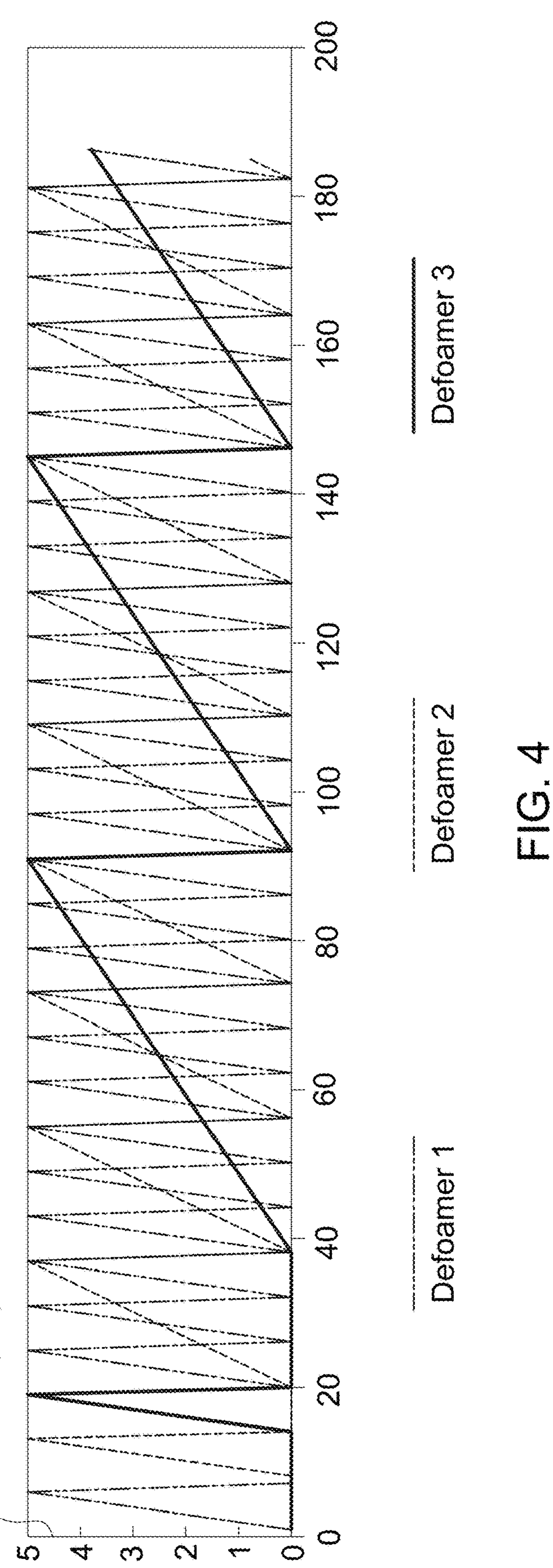
Figure 5:
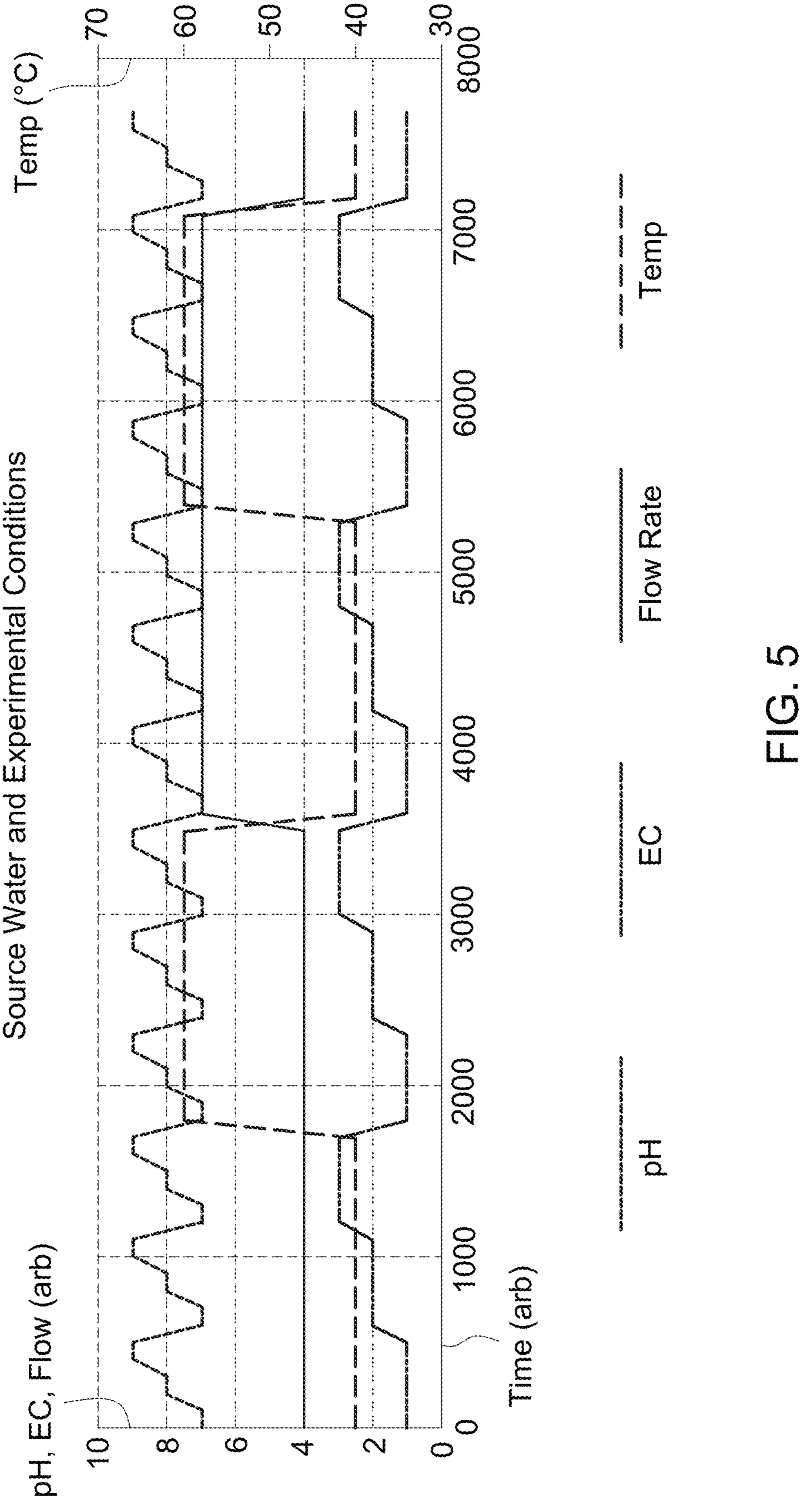
FIG. 5 is a graphical diagram representing an exemplary variation of source water and experimental conditions in a stepwise fashion with respect to the pulp and paper process application.
Figure 6A:
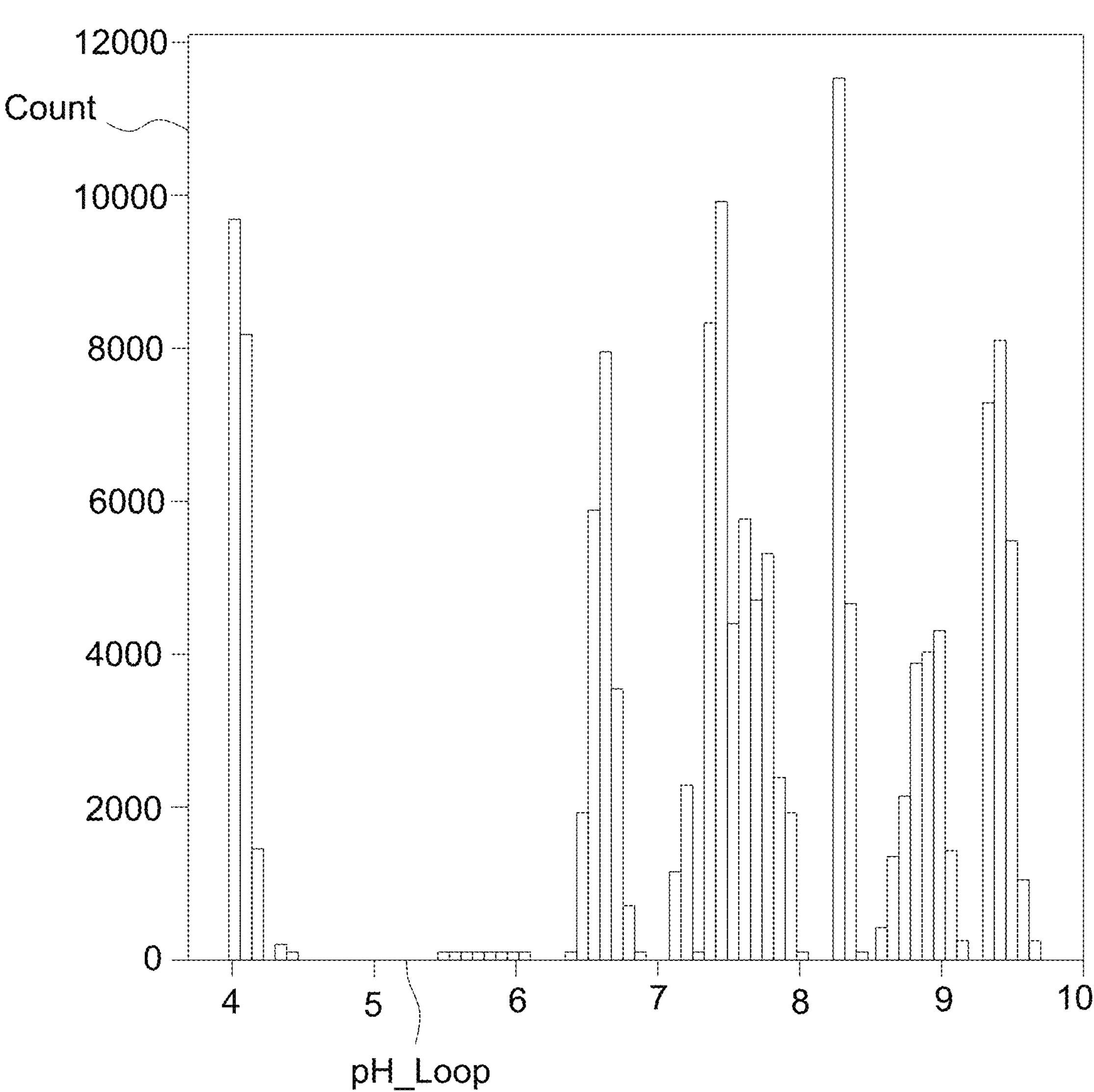
FIGS. 6A-6D are graphical diagrams representing examples of historical plots of various data ranges with respect to the pulp and paper process application.
Figure 6B:
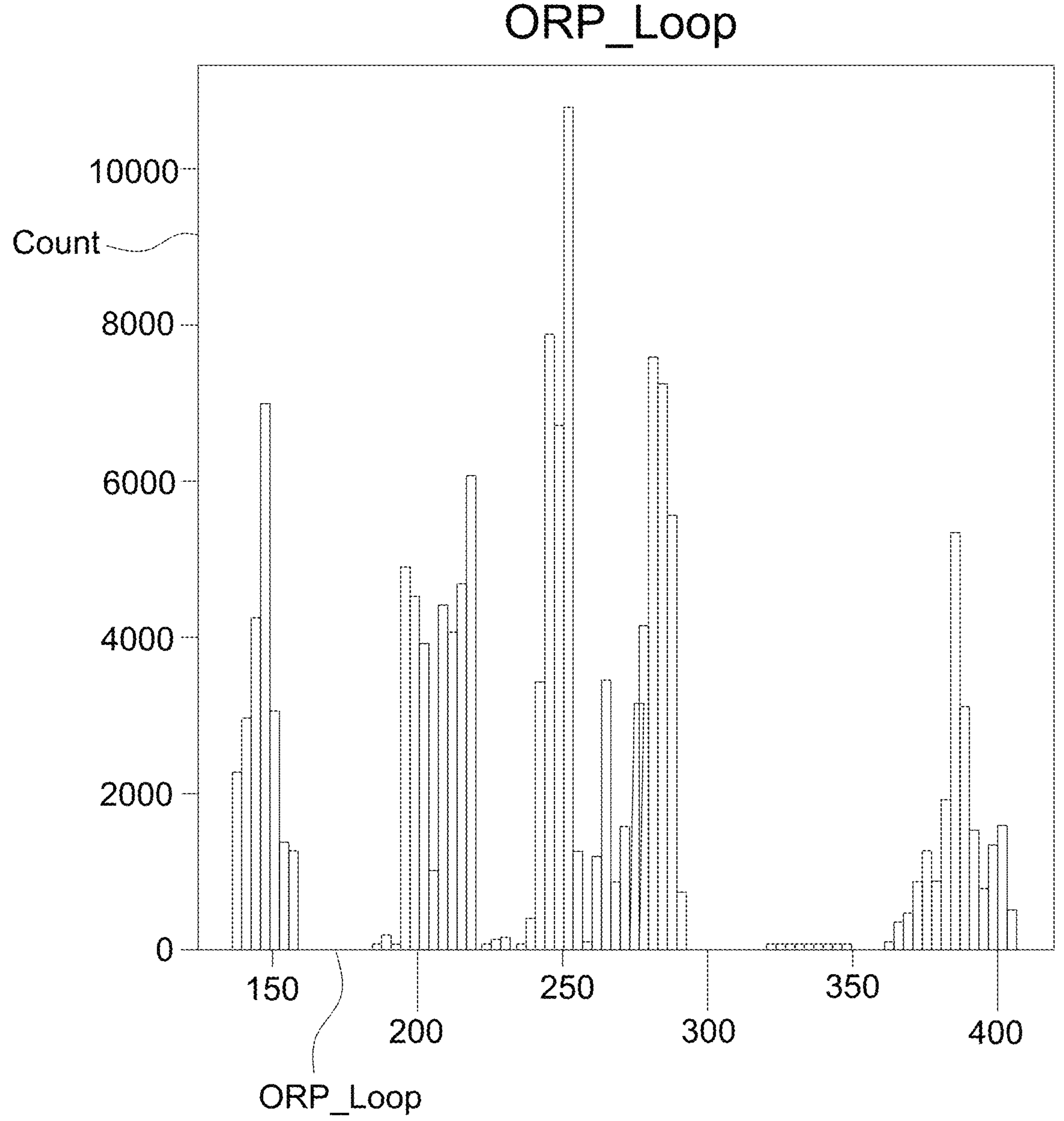
Figure 6C:
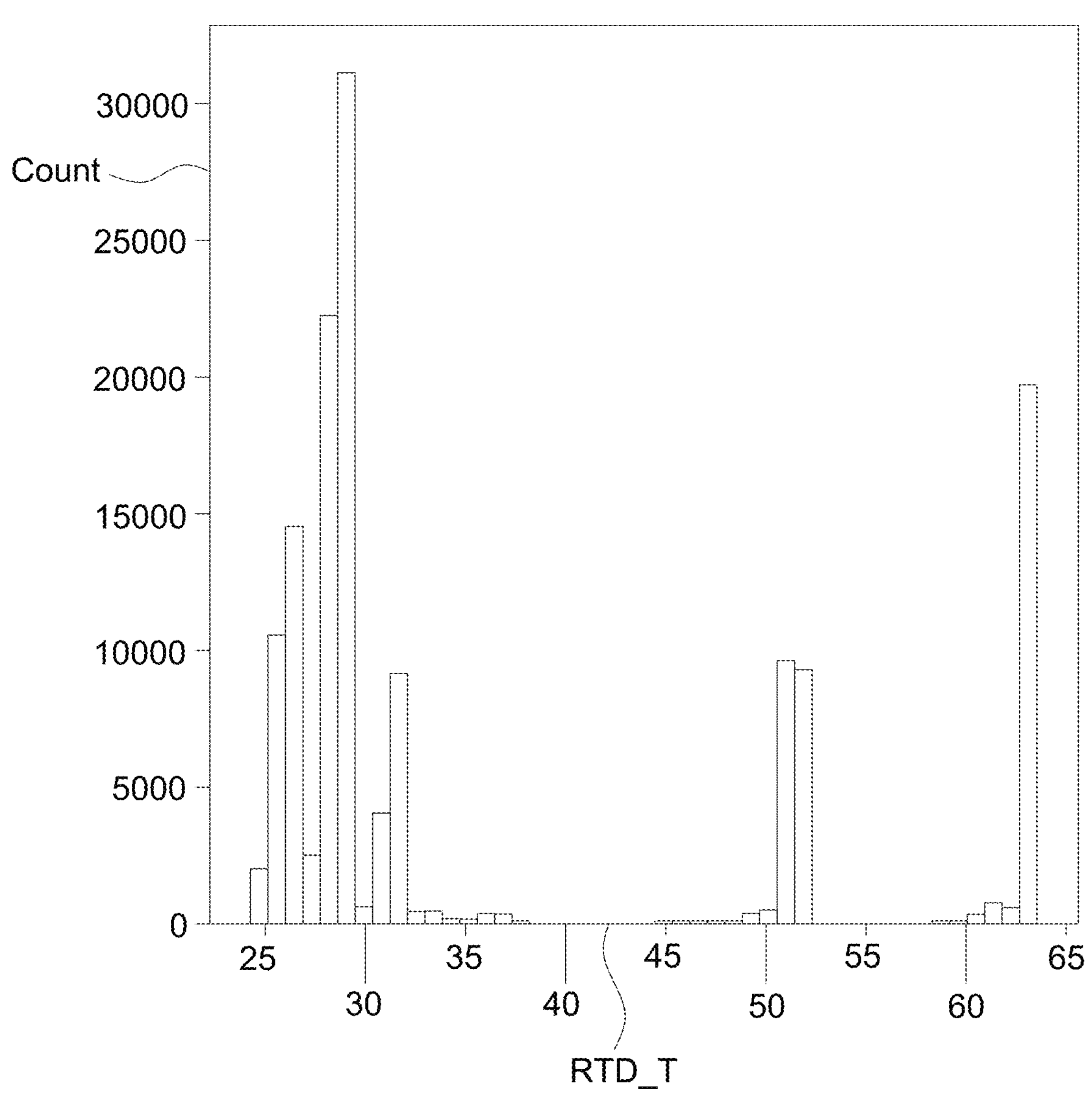
Figure 6D:
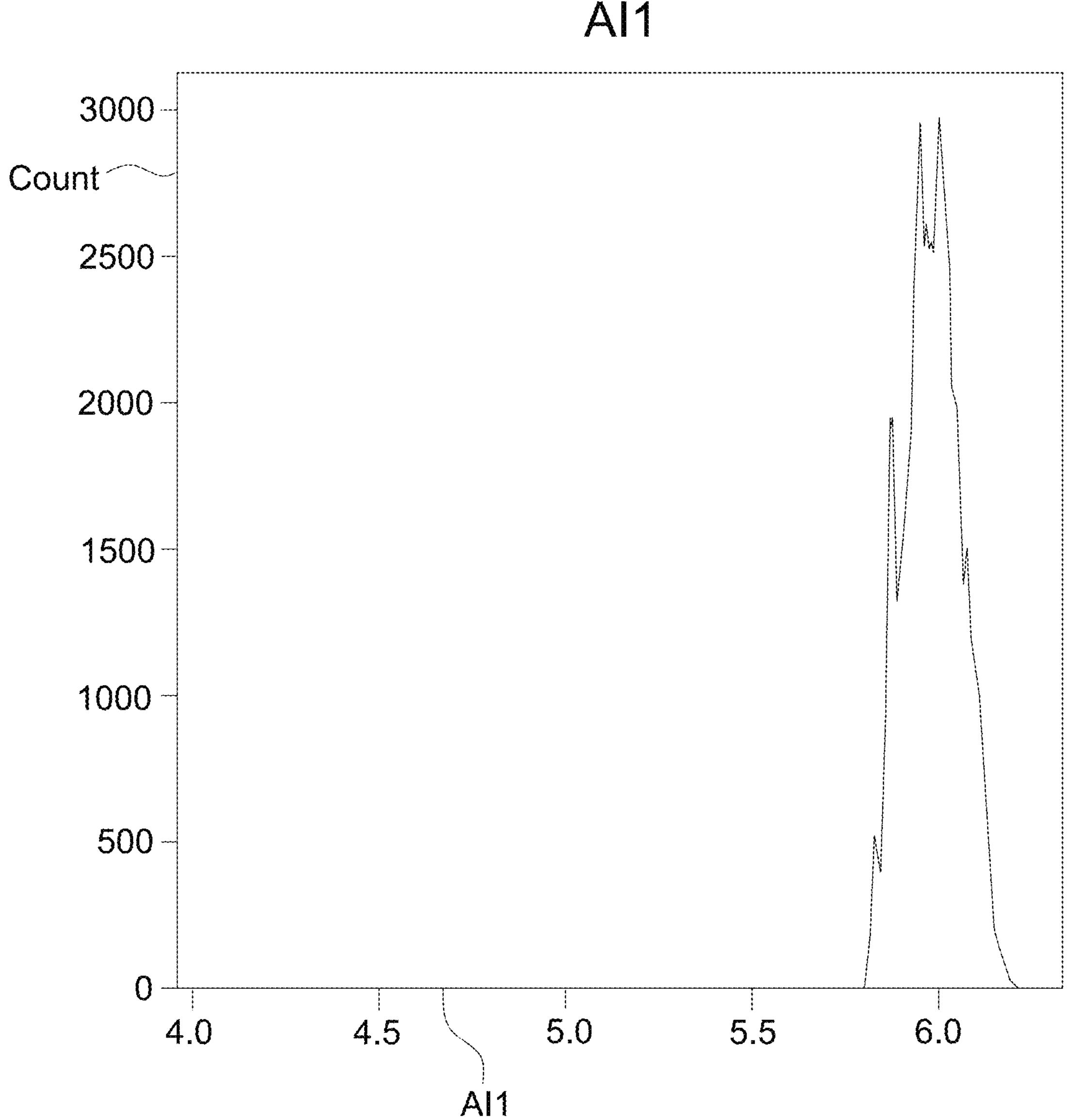

As illustrated in FIG. 4, the three pumps 308*a*, 308*b*, 308*c*, may have different pumping times/speeds to generate various combinations of defoamer concentrations at any given time. This is an example of one of many ways the pumps can deliver components. In various embodiments, the term 'pump' as used herein is not limited to pumping systems or methods having for example programmable and dynamic pumping speeds, but may unless otherwise specifically noted may more generally include structures and/or methods to deliver components such as, for example, gravity feed systems.

The properties of the whitewater used for testing, such as pH, conductivity, and foam content, for example, may be altered during the experiment by the addition of acid/base, $Na_2SO_4$, and foaming agent, respectively. These additions may be executed in a stepwise manner or through slow ramping. In the case of stepwise changes, the parameters may be changed one at a time and maintained constant until one full cycle of defoamer dosing is completed.

This setup may preferably allow precise control of the dosing of defoamer as well as water conditions, and monitoring of the properties of the source whitewater, effectively in real time.

In an embodiment, a first phase of the experiment may introduce control targets such as for example entrained air, alone or further in view of surface foam, which may be recorded via corresponding experimental parameters such as % GVF and foam height in real time using sensors or equivalent devices as are known in the art for their respective purposes, including but not limited to the Echowise® series of sensors, which can measure and report the volumetric percent of entrained gas (i.e., % GVF or gas volume fraction). The % GVF value may be recorded in real time along with the other experimental parameters.

In various embodiments, defoamer components for the experiment may be selected according to their primary effect on foaming.

In one particular experiment performed by the inventors, one component was based on a basic fatty alcohol emulsion. Fatty alcohols are relatively short lived but provide a quick knockdown of surface foam. A second component was based on EO-PO block copolymers, wherein the selection in this category provided good de-aeration along with good persistence. A third component was based on ethoxylated esters, wherein the chosen ester provided good de-aeration but in general did not have good persistence.

Consideration in the selection of the components was given to allow the same surfactant package to be used, and accordingly to allow all three components to be formulated into one formulation if/when necessary.

In various embodiments, data sets representing the difference in defoamer component performance may be recorded for whitewater with different properties. Real time process variables such as pH, ORP, conductivity, temperature and flow rate may be systematically adjusted in a stepwise and controlled manner.

The effects of chemical dosage and duration of defoamer components may for example be evaluated on the whitewater in terms of foam, foam structure, foam height and percent gas volume fraction (% GVF).

The acquired data sets may be visualized to overview data distribution in the user interface, for example including the information of maximum, minimum, and median values in boxplot or histogram plot, as illustrated in FIGS. 6A-6D.

Figure 7:
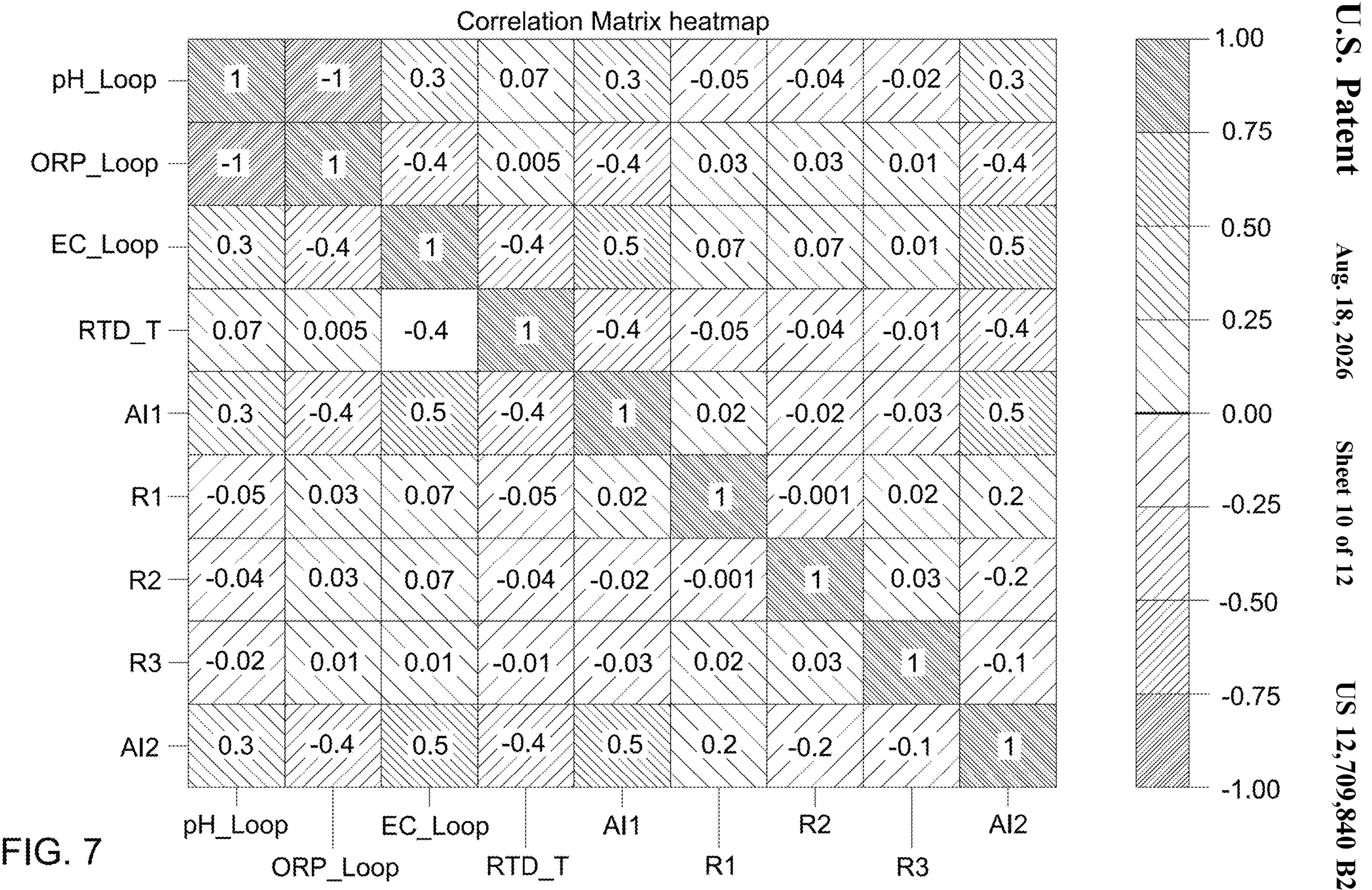
FIG. 7 is a graphical diagram representing a heatmap correlation between various variables with respect to the pulp and paper process application.

Data analysis including correlation analysis and feature importance analysis may be conducted and visualized in the user interface to demonstrate how process variables and defoamer dosing will impact target foam properties in whitewater. As illustrated in FIG. 7, an exemplary heatmap correlation may be represented between variables including flow rate (AI1), temperature (RTD_T), conductivity (EC_Loop), oxidation-reduction potential (ORP_Loop), pH (pH_Loop), % GVF (AI2), defoamer component 1 (R1), defoamer component 2 (R2), defoamer component 3 (R3), and the like.

Figure 8:
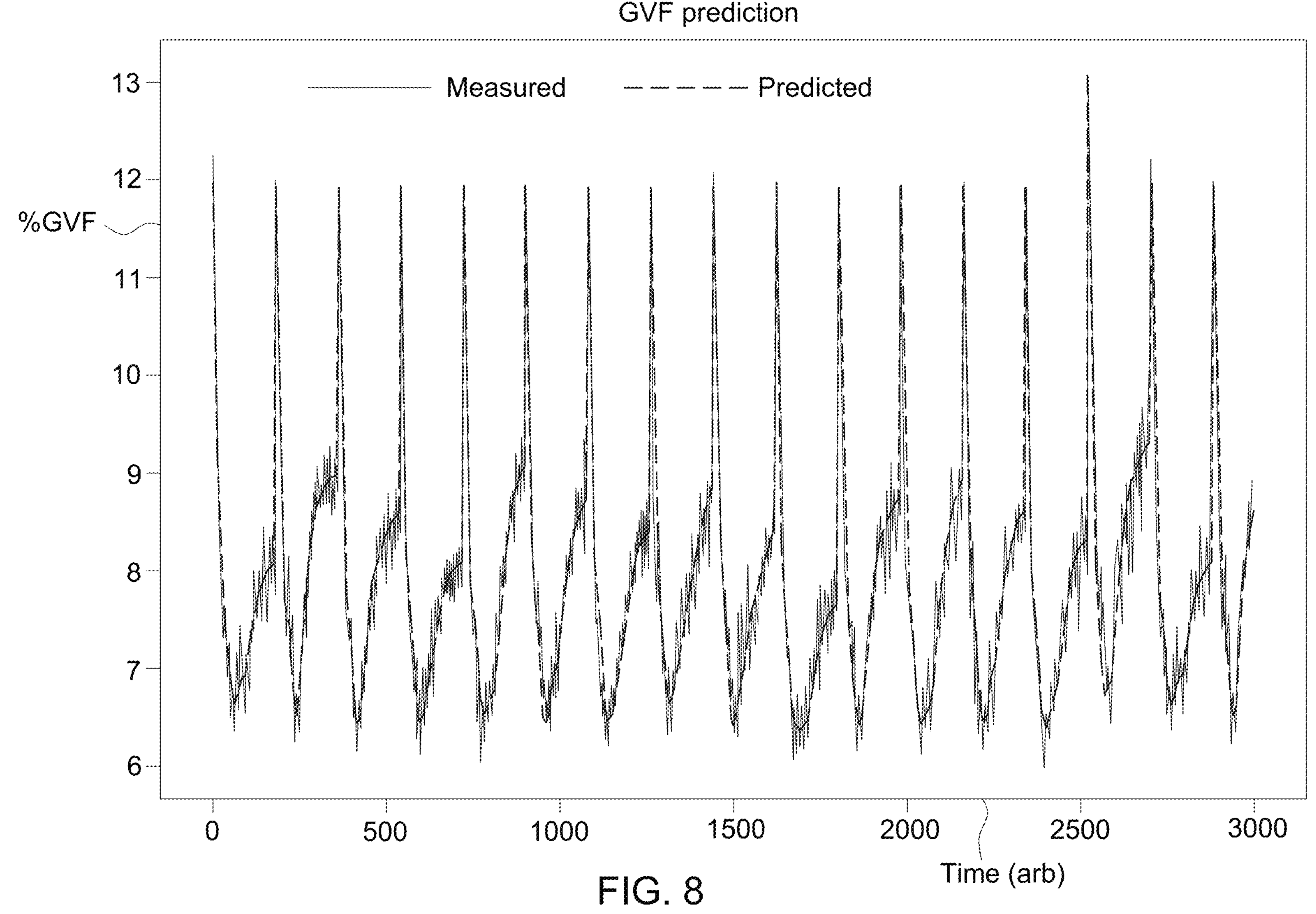
FIG. 8 is a graphical diagram representing real time prediction of defoamer performance using learning algorithms with respect to the pulp and paper process application.
Figure 9:
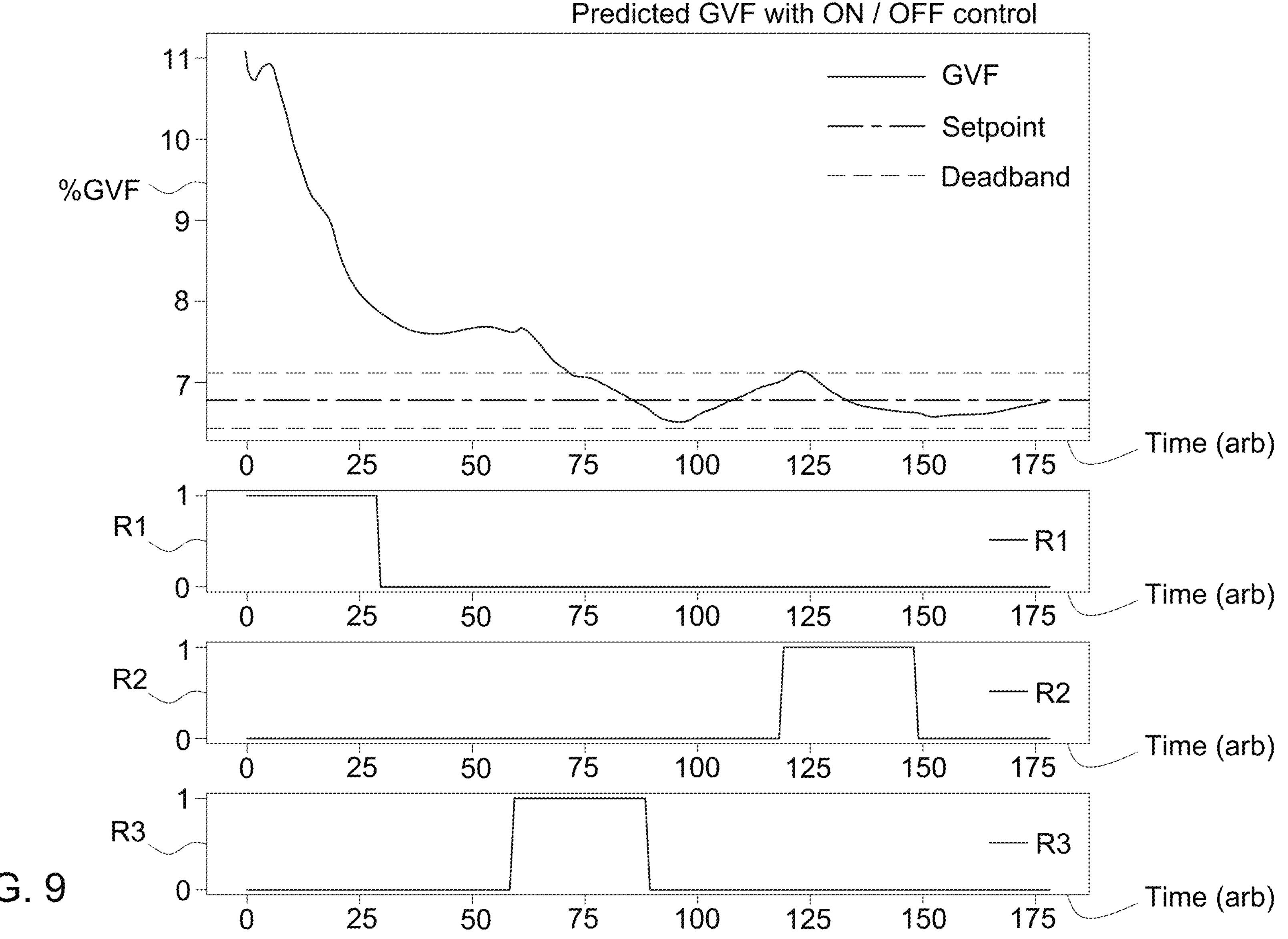
FIG. 9 is a graphical diagram representing optimization of defoamer component addition using learning algorithms with respect to the pulp and paper process application.

Based on the data sets collected, real time prediction of defoamer performance and the optimization of defoamer component addition can be calculated with the proper application of artificial intelligence/machine learning/deep learning (AI/ML/DL) algorithms. As represented in FIG. 8, predicted values for a parameter such as % GVF may be compared to corresponding real (e.g., measured) data values. As represented in FIG. 9, the respective pumps for each controlled defoamer component R1, R2, R3 are turned on and off based on predicted % GVF values to maintain a target % GVF setpoint.

AI/ML/DL results may be transferred through a user interface to achieve data visualization and real time control of each defoamer component to target value setpoints.

The setpoints of target foam properties may be determined in the user interface. The optimized control strategy from AI/ML/DL algorithms may be applied to or otherwise through the controller and/or actuator(s) for automation purposes.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A computer-implemented method for proactive intervention in an industrial process involving a defoamer composition, the defoamer composition comprising one or more components and introduced within the industrial process via a defoamer feed unit, the method comprising:

iteratively training one or more learning models based on historical input data sets comprising directly measured variables from the industrial process and correlations between combinations of the input data and respective process states;

for a current input data set associated with the industrial process, and responsive to at least one detected process attribute, determining an intervention event with respect to at least a first defoamer component in a current defoamer composition;

predicting, via at least one retrieved model of the one or more learning models responsive to the determined intervention event, a change in target values within a specified range of target values for at least one other component in the current defoamer composition and/or for at least one of the directly measured variables as corresponding with a specified process state; and automatically controlling respective actuators associated with the at least first component to generate a new defoamer composition, and further in view of the change in target values for the at least one other component and/or for the at least one of the directly measured variables.

2. The computer-implemented method of claim 1, comprising automatically controlling the respective actuators to control a concentration ratio of a plurality of components in the new defoamer composition.

3. The computer-implemented method of claim 2, comprising automatically controlling the respective actuators to further dynamically and independently control a relative timing of addition for each defoamer component of the plurality of defoamer components.

4. The computer-implemented method of claim 1, wherein the change in target values is predicted based on a modeled correlation between the current input data and the specified process state.

5. The computer-implemented method of claim 4, comprising automatically optimizing the new defoamer composition based on the current input data set and one or more user specified parameters, and the predicted change in target value, wherein the respective actuators associated with the at least first component are automatically controlled to generate the optimized defoamer composition.

6. The computer-implemented method of claim 5, wherein the one or more user specified parameters comprise one or more of cost, amount of chemicals, hazards, environmental sustainability, location of addition, desired defoaming rate, defoamer dosing sequence, and/or pump duty cycles.

7. The computer-implemented method of claim 1, wherein the directly measured variables from the industrial process comprise two or more of: entrained air; foam height; conductivity; turbidity; temperature; oxidation-reduction potential, and pH.

8. The computer-implemented method of claim 7, wherein foam height is directly measured from input signals received from a digital camera, optical device, acoustic device, capacitive device, radio wave device, electrical contact device, and/or a combination thereof.

9. The computer-implemented method of claim 8, wherein a digital camera is arranged online and having sufficient resolution for close-up images and analysis of film thickness and bubble size therefrom.

10. The computer-implemented method of claim 1, wherein the at least one detected process attribute relates to a threshold foaming condition.

11. The computer-implemented method of claim 1, wherein the at least one detected process attribute relates to an observed foaming condition having a predictive quality according to a selected machine learning model.

12. The computer-implemented method of claim 1, wherein, for the current input data set associated with the industrial process, and responsive to the at least one detected process attribute, an event requiring intervention with respect to the at least first defoamer component in the current defoamer composition is predicted based on patterns derived from a selected learning model.

13. The computer-implemented method of claim 1, comprising:

responsive to the determined intervention event, generating an output signal to produce an audio and/or visual alert to an operator control panel, and/or a remote user interface, in association with generation of the new defoamer composition.

14. The computer-implemented method of claim 13, wherein the output signal produces a visual representation of the change in target values for the components of the new defoamer composition.

15. A system for proactive intervention in an industrial process, the system comprising:

one or more online sensors configured to generate output signals representative of directly measured variables from the industrial process;

a defoamer feed unit configured to controllably introduce a defoamer composition comprising specified amounts at specified dosing rates for each of one or more components within the industrial process; and one or more processors functionally linked to the one or more online sensors and the defoamer feed unit, and configured to:

iteratively train one or more learning models based on historical input data sets comprising directly measured variables from the industrial process and correlations between combinations of the input data and respective process states;

for a current input data set associated with the industrial process, and responsive to at least one detected process attribute, to determine an intervention event with respect to at least a first defoamer component in a current defoamer composition;

predict, via at least one retrieved model of the one or more learning models responsive to the determined intervention event, a change in target values within a specified range of target values for at least one other component in the current defoamer composition and/or for at least one of the directly measured variables as corresponding with a specified process state; and automatically control respective actuators associated with at least the at least first component to generate a new defoamer composition, and further in view of the change in target values for the at least one other component and/or for the at least one of the directly measured variables.

16. The system of claim 15, wherein the respective actuators are automatically controlled to control a concentration ratio of a plurality of components in the new defoamer composition.

17. The system of claim 16, wherein the respective actuators are automatically controlled to further dynamically and independently control a relative timing of addition for each defoamer component of the plurality of defoamer components.

18. The system of claim 15, wherein the change in target values is predicted based on a modeled correlation between the current input data and the specified process state.

19. The system of claim 18, wherein a new defoamer composition is automatically optimized based on the current input data set and one or more user specified parameters, and the predicted change in target value, wherein the respective actuators associated with the at least first component are automatically controlled to generate the optimized defoamer composition, and wherein the one or more user specified parameters comprise cost and/or location of addition.

20. The system of claim 15, wherein:

the directly measured variables from the industrial process comprise foam height and one or more of: entrained air; conductivity; turbidity; temperature; oxidation-reduction potential, and pH; and the foam height is directly measured from input signals received from a digital camera, optical device, acoustic device, capacitive device, radio wave device, electrical contact device, and/or a combination thereof.

* * * * *